(12) United States Patent
Lee

(10) Patent No.: US 8,347,366 B2
(45) Date of Patent: Jan. 1, 2013

(54) METHOD AND APPARATUS FOR IMPROVED CONNECTION OF WIRELESS DEVICES USING THIRD PARTY PROGRAMMING CAPABILITY

(75) Inventor: Hanjin Lee, Skillman, NJ (US)

(73) Assignee: Koamtac, Inc., Princeton, NJ (US)

( * ) Notice: Subject to any disclaimer, the term of this patent is extended or adjusted under 35 U.S.C. 154(b) by 344 days.

(21) Appl. No.: 12/798,184

(22) Filed: Mar. 31, 2010

(65) Prior Publication Data

US 2011/0247056 A1    Oct. 6, 2011

(51) Int. Cl.
*G06F 7/04* (2006.01)
*H04B 7/00* (2006.01)

(52) U.S. Cl. ............ 726/5; 726/2; 726/3; 726/4; 726/6; 455/41.2; 455/41.3; 709/238

(58) Field of Classification Search ........ 455/41.2–41.3; 726/2–6; 709/238
See application file for complete search history.

(56) References Cited

U.S. PATENT DOCUMENTS

| | | |
|---|---|---|
| 2005/0220221 A1 | 10/2005 | Grignani et al. |
| 2007/0105500 A1* | 5/2007 | Kim .......................... 455/41.2 |
| 2007/0123166 A1* | 5/2007 | Sheynman et al. ......... 455/41.2 |
| 2007/0197164 A1 | 8/2007 | Sheynman et al. |
| 2008/0076389 A1 | 3/2008 | Lee et al. |
| 2008/0176516 A1* | 7/2008 | Kim .......................... 455/41.2 |
| 2009/0264070 A1* | 10/2009 | Lim .......................... 455/41.2 |
| 2010/0130132 A1* | 5/2010 | Lee et al. ................... 455/41.3 |

OTHER PUBLICATIONS

Christian Gehrmann, Bluetooth™ Security White Paper, Bluetooth SIG Security Expert Group, Apr. 19, 2002, pp. 1-46.*

* cited by examiner

*Primary Examiner* — David Pearson
*Assistant Examiner* — Amir Mehrmanesh
(74) *Attorney, Agent, or Firm* — Robert S. M. Gorman; Gorman Law Offices

(57) ABSTRACT

Provided are a method and an apparatus for searching neighboring Bluetooth® devices through an external terminal having programming capability. The inventive method provides for a slave Bluetooth® device to receive, from the external terminal, the MAC address and optional device name from a target Bluetooth® device.

9 Claims, 7 Drawing Sheets

Download Bluetooth® MAC Address into Bluetooth® Peripheral Device

FIG. 1A: Download Bluetooth® MAC Address into Bluetooth® Peripheral Device
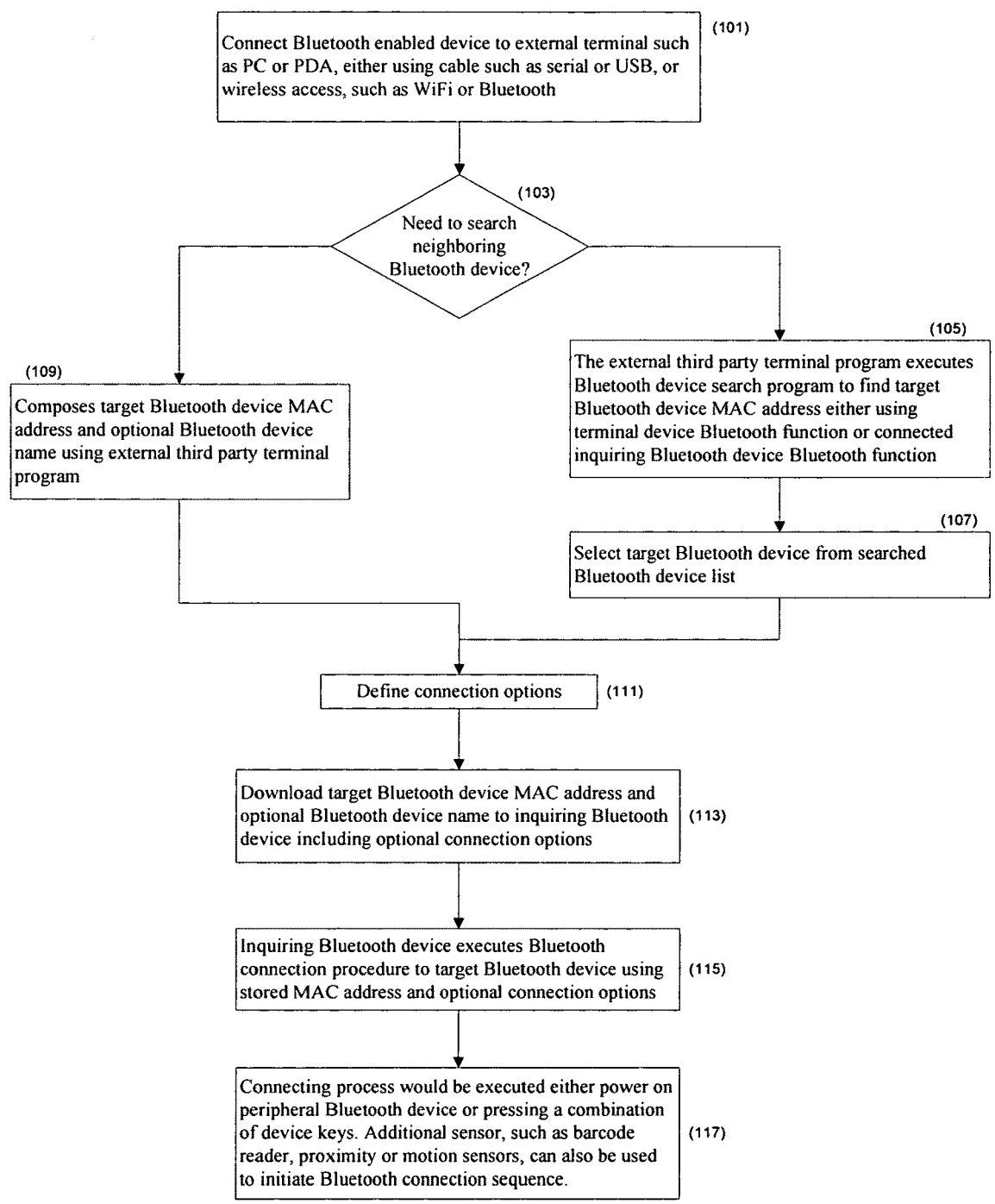

FIG. 1B: Direct Bluetooth® Connection Process
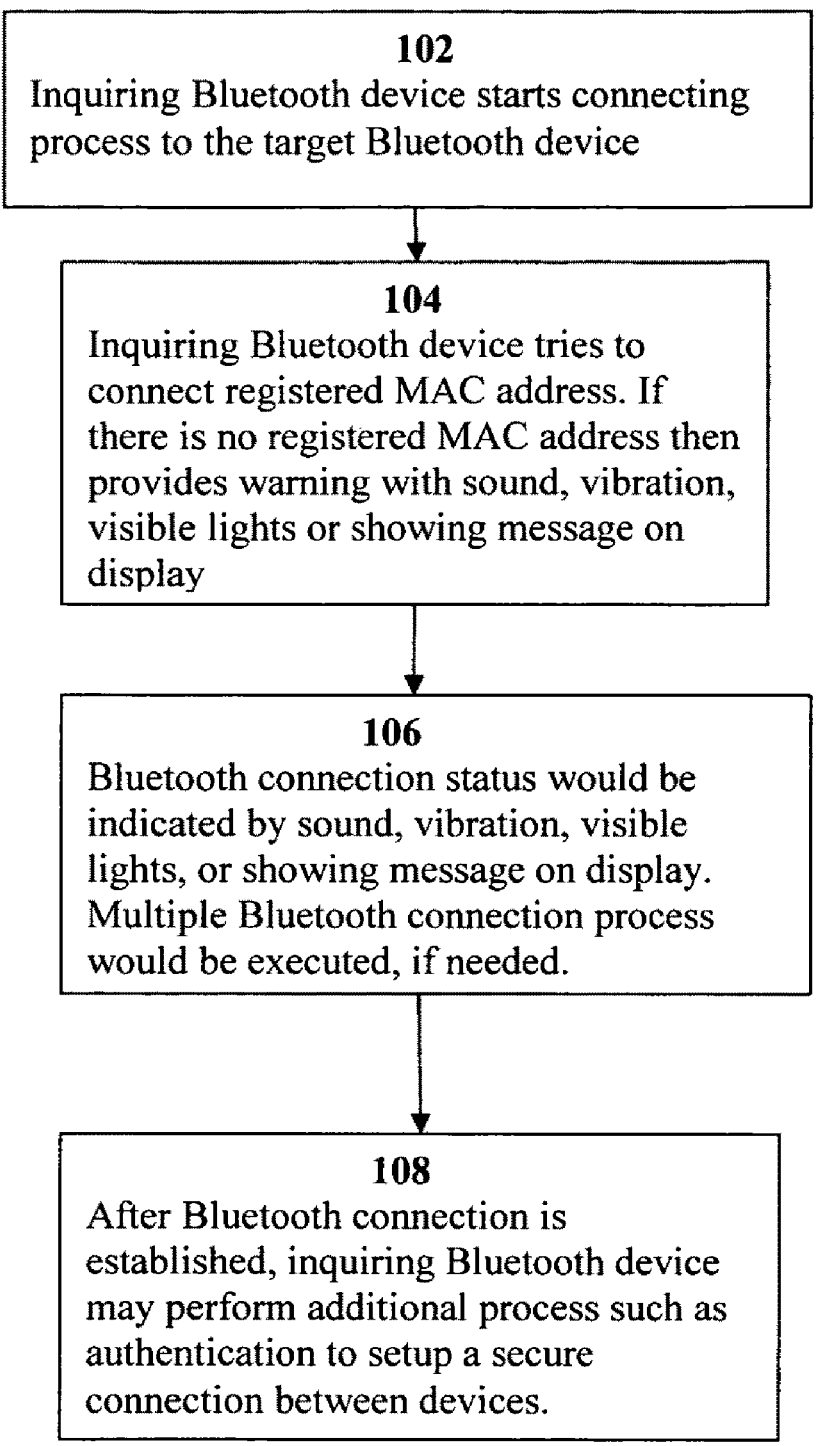

Bluetooth® Page(Search) and Inquiry(Connect) Process with Optional Authentication Process Bluetooth® Page(Search), Inquiry(Connect), Download and Connect Process using third party terminal with programming capability

Connecting Bluetooth® Device with Authentication Function

Page, Inquiry and Authentication Flow

- Search (Discover) Option
- Manual MAC address and PIN entry option
- Prefix and Suffix entry option
- Register (Downloading) option

Bluetooth® MAC, PIN, Prefix, Suffix Search and Manual entering program

METHOD AND APPARATUS FOR IMPROVED CONNECTION OF WIRELESS DEVICES USING THIRD PARTY PROGRAMMING CAPABILITY

BACKGROUND OF THE INVENTION

1. Field of the Invention

The present invention relates to an improved Bluetooth® device search and connect process. More particularly, the inventive process for Bluetooth® pairing may be performed with a third party terminal that has programming capability. The third party terminal will make a list of neighboring Bluetooth® devices and will provide the list to a pairing (slave) device. Neighboring Bluetooth® device lists may be composed by using either a "third party terminal" Bluetooth® capability, or alternatively, through an "inquiring device" (e.g., pairing) Bluetooth® capability, whereby an inquiring device uses a list of neighboring Bluetooth® devices provided by a third party to connect to other Bluetooth® devices. This third party paging invention can be applied to other wireless technologies such as Wi-Fi and WiMax, and any reference herein to the term "Bluetooth®" is also meant to include applications to all other manner of wireless, as well as wired technologies.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Wireless terminals such as computers, cell phones, personal digital assistants (PDAs), barcode scanners, printers, etc are becoming increasingly useful among consumers and within industry. These devices often use Bluetooth® as a wireless technology, Bluetooth® is a technology promoted by the Bluetooth® SIG of Kirkland, Wash., for providing short range wireless communications that makes it possible to wirelessly connect Bluetooth® enabled devices within a relatively short range at low cost. In Bluetooth® communication, radio frequencies are used to exchange voice and data signals between Bluetooth® devices within a relatively short range without the need for physical cables. For example, when a mobile communication terminal and a laptop computer are each equipped with a Bluetooth® module, they can be wirelessly connected each other, i.e. without using cables. Almost all types of digital devices such as personal digital assistants (PDAs), desktop computers, facsimiles (FAXs), keyboards, and joysticks can utilize Bluetooth® communication if they have a Bluetooth® module.

A device having a Bluetooth® module searches neighboring Bluetooth® devices and performs a pairing process with the searched Bluetooth® device so that it can wirelessly communicate with the searched Bluetooth® device(s). The pairing process is an authentication process in which an inter-device common link key defined in the Bluetooth® interface standard is created to authenticate an inter-device common link. Bluetooth® functionality is widely implemented in various electronics, including cell phones, barcode readers, keyboards and printers. Bluetooth® devices require paging and inquiring process to establish connection between two Bluetooth® devices. To this end, peripheral Bluetooth® devices such as barcode scanners, keyboards, joysticks and printers are normally developed as a Bluetooth® slave device, without the capacity to initiate direct Bluetooth® connection features to the other Bluetooth® devices (whether master devices such as a PC, a PDA, or slave devices such as the illustrative barcode scanners, keyboards, joysticks and printers.) However, users of these peripheral (slave) Bluetooth® devices may nevertheless need to initiate a connection to other Bluetooth® devices directly sometimes, but cannot do so in the current art of Bluetooth® enabled electronic devices.

Furthermore, certain Bluetooth® enabled electronic devices are structured so as to magnify the above problem further. For example, one popular electronic device in use today is the Apple iPhone®, which is available from Apple, Inc., of Cupertino, Calif. As evidence of the aforementioned additional difficulties encountered in the known art, the Apple iPhone® does not even provide page (search) and inquiry (connect) function for these peripheral devices. This is because the Apple iPhone® and some other proprietary devices differ in an additional aspect. Specifically, typical (e.g., non-iPhone®) connecting Bluetooth® devices (master devices such as PCs and PDAs) provide rudimentary Bluetooth® manager software. This software allows for the master device to search neighboring Bluetooth® devices (Bluetooth® calls this process as "pairing"), and permits a user to select a device to connect (Bluetooth® calls this process as "inquiring"), such that a connected device may be requested to enter a PIN to connecting device and thereafter, the two devices are connected if the PIN matches. Unfortunately, however, iPhone® has blocked the ability to list peripheral/neighboring Bluetooth® devices (except for a nominal Bluetooth® headset) during its search process, and as such, does not support any other manner of Bluetooth® enabled devices, thus slave and other devices cannot perform a connection.

Thus, full, reciprocal connectivity between all manner of peripheral Bluetooth® devices (whether barcode scanners, printers, keyboards and joysticks) and all types of master Bluetooth® devices remains elusive because one simply cannot initiate either the pairing and/or inquiring process given the lack of either programming features, or due to the lack of displays for controlling the pairing and the inquiry (inquiring) process. Further to this point, and as alluded to above, peripheral Bluetooth® devices typically lack either programming capability or display functions such that a paged (searched) device list cannot be controlled in proper manner, despite the fact that this is a very common Bluetooth® manager function that exists (for non-iPhone® type connections) on most non-peripheral (master) Bluetooth® terminals. Because of this, if a user needs to select a Bluetooth® device to inquire from paged (searched) list, it is not a trivial task (from the peripheral Bluetooth® device perspective) to provide the searched list and to allow for the user to select a device from a list. More specifically, this is also because there is a lack of either programming capability, or because of a lack of input and output capability such as buttons, display, visible light, display, speakers, or other external communication ports.

Accordingly, prior art systems, as described below (each of which is hereby incorporated by reference in their respective entireties) merely try to achieve efficient way connecting two Bluetooth® devices and do not address the deficiencies described above. For example, US patent publication number 2008/0076389, titled "An Automatic Pairing Method for a Bluetooth®-Enabled Mobile Terminal" purportedly proposes an automatic paring and connection method using additional authentication signals that are defined between devices, whereby the two devices reportedly check whether they are "automatic pairing and connection enabled" devices (such as Samsung phone and Samsung headset) and perform automatic pairing and connection process without standard user involved paging and inquiring procedure. Similarly, US patent publication number 2007/0197164, titled "Method and Device for Automatic Bluetooth® pairing" purportedly defines a device connection method wherein a slave device tries to connect master device if there is a connected history stored therein. Also, US patent publication number 2005/0220221, titled "Identifying a local device by name" supposedly proposes maintaining a Bluetooth® device name locally in order to speed up inquiring process so as to focus on searching and connection method of slave devices. To this end, users of Bluetooth® enabled electronic devices of all kinds (not just the illustrative iPhone®), are in need of a way to connect directly to peripheral/neighboring Bluetooth® devices, with or without an additional authentication process.

SUMMARY OF THE INVENTION

An object of the present invention is therefore to substantially solve at least the above-described problems and/or disadvantages of conventional systems, and to provide at least the advantages detailed below. Accordingly, an object of the present invention is to provide a method and an apparatus for peripheral Bluetooth® devices peripheral (slave) Bluetooth® devices, such as barcode scanners, keyboards, joysticks and printers to perform paging and inquiring process with third party terminal support.

Another object of the present invention is to provide a method and an apparatus for inquiring (connecting) neighboring Bluetooth® devices through the use of an additional authentication processor during connection process, which can enhance the security of wireless communication between devices. Certain Bluetooth® devices require an additional authentication process which is not defined in Bluetooth® standard protocol, and to this end, the present invention can provide for the inquiring (connecting) devices to detect the needs of additional authentication processor automatically during the inquiring (connecting) process, and can perform an additional authentication process if a given neighboring Bluetooth® device requires an extra authentication process in order to be connected.

According to one aspect of the present invention, this invention defines a Bluetooth® connection method for Bluetooth® peripherals using internal or external terminal with programming capability. These inventive methods may provide for various paging and inquiring options as described below according to this invention.

BRIEF DESCRIPTION OF THE DRAWINGS

The above and other objects, features, and advantages of the present invention will become more apparent from the following detailed description when taken in conjunction with the accompanying drawings in which:

FIG. 1A is a process diagram illustrating a download of a Bluetooth® MAC address into an illustrative Bluetooth® peripheral device;

FIG. 1B is a process diagram illustrating an illustrative Bluetooth® connection process from a Bluetooth® peripheral device and a target Bluetooth® device;

DETAILED DESCRIPTION OF THE INVENTION

Figure 1C:
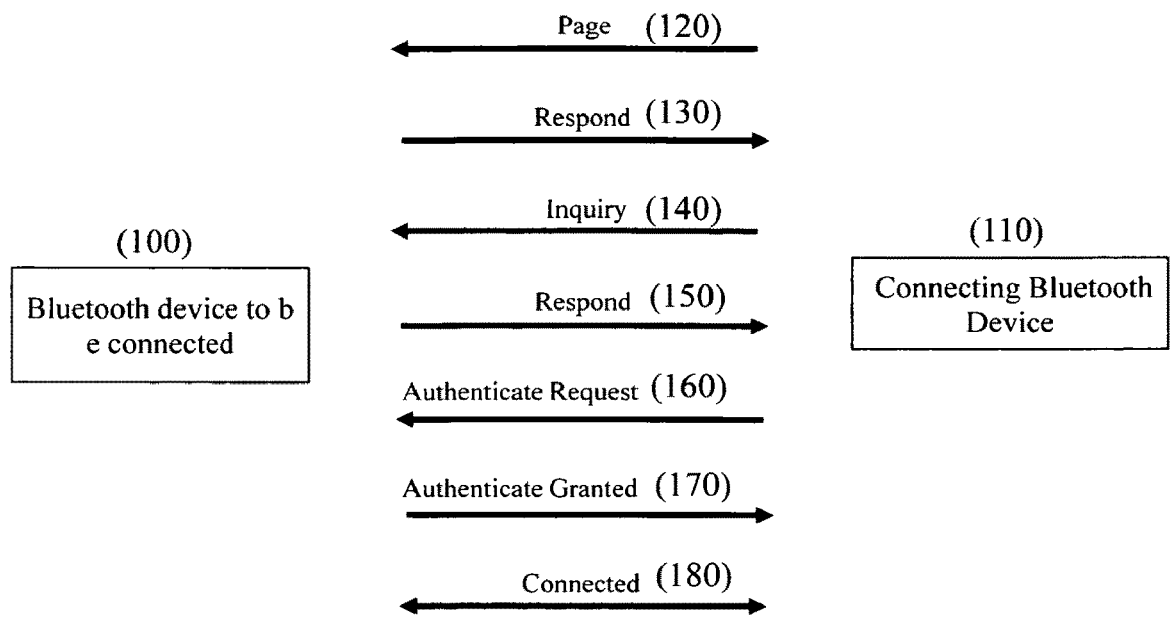
FIG. 1C is a process diagram illustrating Bluetooth® Page (Search) and Inquiry(Connect) Process with Optional Authentication Process.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Accordingly, the present invention introduces a new system and method that uniquely paging (searching) and inquiring (connecting) Bluetooth® devices with additional authentication process. To this end, the present invention introduces a method whereby peripheral Bluetooth® devices can connect to other Bluetooth® devices directly, with an optional authentication process using third party terminal with programming capability. When provisioned in accordance with the particulars disclosed herein, Bluetooth® peripheral devices can become a master (connecting) device, despite the fact that they do not have either the native programming capability or the native output function, such as display or sound.

In accordance with one aspect of the present invention, there is provided, at the broadest level, a system and method for the provision of communication across a plurality of wireless devices in a multiplicity of communication environments comprising: A method (and a device having at least a memory unit configured to store instructions relating to the execution of the present method, and a processor configured to execute the instructions for executing instructions for utilizing the present method), for providing improved wireless connection using third party programming capability, wherein the method comprises the steps of: (a) determining whether at least one slave device needs to connect to an external terminal in order to perform a search and connect function of at least one neighboring Bluetooth® target device(s); (b) connecting, when the at least one slave device needs to connect to an external terminal in order to perform a search and connect function of the at least one neighboring Bluetooth® target device(s), to said external terminal; (c) determining whether there is a need to search for the at least one neighboring Bluetooth® target device(s); (d) entering, when there is no need to search for said neighboring Bluetooth® target device (s), at least one of the following comprising a MAC address, PIN code and a device name of the at least one neighboring Bluetooth® target device(s) manually; (e) generating, when there is no need to search for the at least one neighboring Bluetooth® target device, lists of available said at least one neighboring Bluetooth® target device(s) at the external terminal where the slave device and said external terminal are connected, and generating lists of available the at least one neighboring Bluetooth® target device(s) and the slave device where the slave device has not connected to said external terminal; (f) selecting the at least one neighboring Bluetooth® target device(s) for connection; (g) defining connection options with the at least one neighboring Bluetooth® target device(s), including at least one automatic or manual connection option; and (h) executing a connection between the slave device and the at least one neighboring Bluetooth® target device(s) based upon the at least one automatic or manual connection option. The method of above may further comprise the steps for: determining whether said at least one neighboring Bluetooth® device(s) requires authentication; and for executing, where said at least one neighboring Bluetooth® device(s) requires authentication, authentication between said slave device and said at least one neighboring Bluetooth® target device(s). In addition, the above method of claim may also comprising the steps of: reading a MAC address and PIN number from the at least one neighboring target Bluetooth® device through the use of at least a barcode reader or an optical character reader. To this end, the above inventive approaches may also be embodied in a computer-readable recording medium having recorded thereon a program for use on a slave wireless device for detecting and connecting with a neighboring wireless device comprising code segments for executing each of the above describing steps within the present invention.

Figure 5:
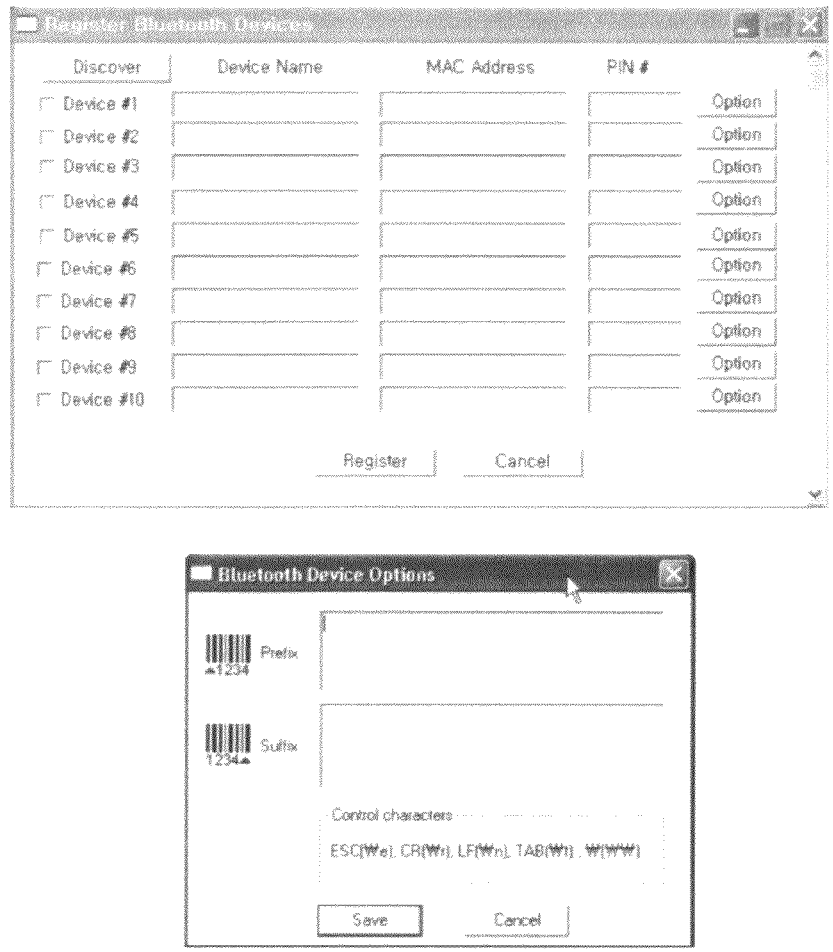
FIG. 5 is a depiction of on illustrative screen shot from the described exemplary software which a user might utilize in manually entering a Bluetooth® MAC, PIN, Prefix, Suffix Search, etc. of a neighboring Bluetooth® target device.

With reference to FIG. 1A, in one embodiment of the present invention, is provided for a download of at least one MAC address into a Bluetooth® peripheral device. Specifically, the inventive aspect in this regard might illustratively commence with a connection of a Bluetooth® enabled device to an external terminal such as a PC or PDA, either using a cable such as a serial or USB, or wireless connection such as Wi-Fi or Bluetooth®, as seen 101. Target Bluetooth® MAC address and optional Bluetooth® device name can be either entered manually (see, FIG. 5 for illustrative depiction thereof) or may be selected using Bluetooth® device search program, as seen at 103. At 105, the external third-party terminal execute a Bluetooth® device search program to find a target Bluetooth® device MAC address by either using a terminal device Bluetooth® function or connected inquiring Bluetooth® device Bluetooth® function. A searched Bluetooth® device list would be uploaded to the terminal (e.g., a PC, PDA, etc.) if a connecting Bluetooth® peripheral device Bluetooth® function is used to search neighboring Bluetooth® devices. At 107, the target Bluetooth® device is selected from the search list at 105. At 109, target Bluetooth® device MAC address and optional Bluetooth® device name is assigned manually. AT 111, optional connection methods are defined. At 113, there is a download of a MAC address from an external third party terminal using a MAC address download program. At 115, an inquiring Bluetooth® device executes a Bluetooth® connection to a target Bluetooth® device using a stored MAC address from an external terminal. In 117, and the connection process would be executed by either powering on a peripheral Bluetooth® device, or by a combination of device keys.

Additional sensors such as a bar code reader or proximity or motion sensors can also be used to initiate a connection sequence. The connection process may be seen in FIG. 1B. Beginning with 102, an inquiring Bluetooth® device starts the connecting process to the target Bluetooth® device. Thereafter, an inquiring Bluetooth® device tries to connect to the registered MAC address. If there is no registered MAC address, warning signal would be generated at 104. 106, a Bluetooth® connection status is indicated by sound, vibration, visible light, or display of a message. Multiple Bluetooth® connection processes would be executed, if needed at 106. At 108, after a Bluetooth® connection is established a Bluetooth® peripheral device may perform additional processes, such as an authentication to set up a secure connection between devices. With reference then, to FIG. 1C, a Bluetooth® device to be connected (100) interfaces with a connecting Bluetooth® device (110) through the following illustrative steps: page (120), respond (130), inquiry (140), respond (150), authenticate request (160), authentication grant (170), and connection (180).

Figure 2:
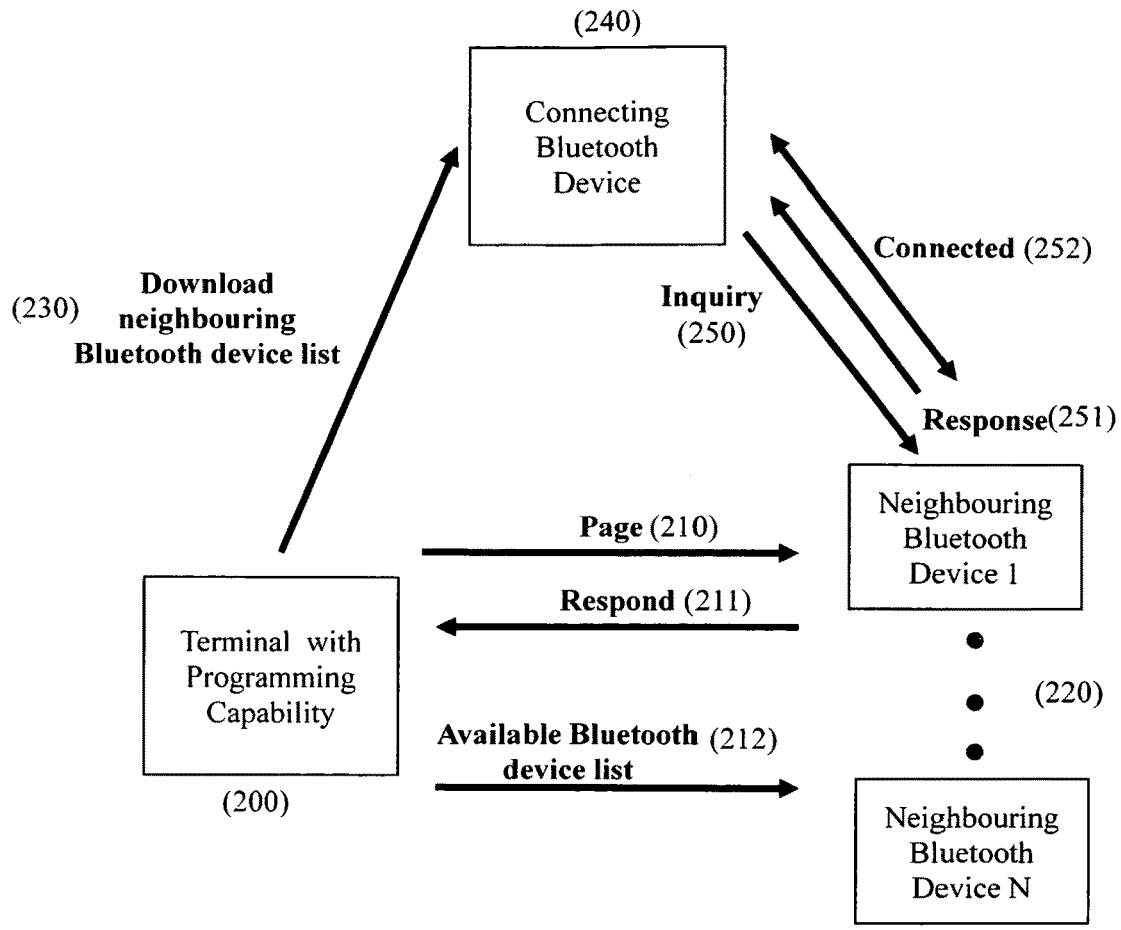
FIG. 2 is a process diagram illustrating Bluetooth® Page (Search), Inquiry(Connect), Download and Connect Process using third party terminal with programming capability.

Turning then, to FIG. 2, is a depiction of a Bluetooth® page (Search), inquiry (Connect), download and connect process using a third-party terminal with programming capability. As can be seen therein, a terminal with programming capability (200), may at (230) download a neighboring Bluetooth® device list to a connecting Bluetooth® device (240), after it has executed the steps of page (210), respond (211), and generate an available Bluetooth® device list (212) with neighboring Bluetooth® devices 1-$n$ (220). Either with a download from the terminal programming capability or from a self generated list, connecting Bluetooth® device (240) can utilize a connection generated natively (or with the help of terminal with programming capability (200)), so as to connect with neighboring Bluetooth® target devices 1-$n$ (220) by generating an inquiry step (250), a response step (251), and a resulting connection (252). Note that a connecting Bluetooth® device (240) may be either a slave (peripheral) device, such as a printer, phone, joystick, hand held scanner, etc., and would need to be downloaded with Bluetooth® management software such as the KTSync™ software described herein, or may be a unit such as the illustrative KDC™ 200 type unit (also described herein) which already has built in Bluetooth® management software therein. The terminal with programming capability (200) may be any type of Bluetooth® enabled device, such as a PC or PDA with KTSync™ type software downloaded into it, or a KDC™ 200 type unit, both of which are available from KoamTac™ Inc., of Princeton, N.J. It is worth noting, that, one generally would need to include a terminal with programming capability at 200 if the slave (peripheral device does not have the ability to function with/without KTSync™ type software downloaded therein, and/or with a KDC™ type unit. This is especially true in cases where the neighboring Bluetooth® target device requires authentication. If there is no authentication scheme, it may be possible to dispense with a KDC™ type unit, and may function with only a PC or PDA that has KTSync™-type software downloaded to it (this may be the case where the neighboring Bluetooth® target device is a RIM Blackberry® or Microsoft Windows® mobile device which typically does not require additional authentication other than entering PIN, unlike an iPhone® which does require an additional authentication process.

Figure 3:
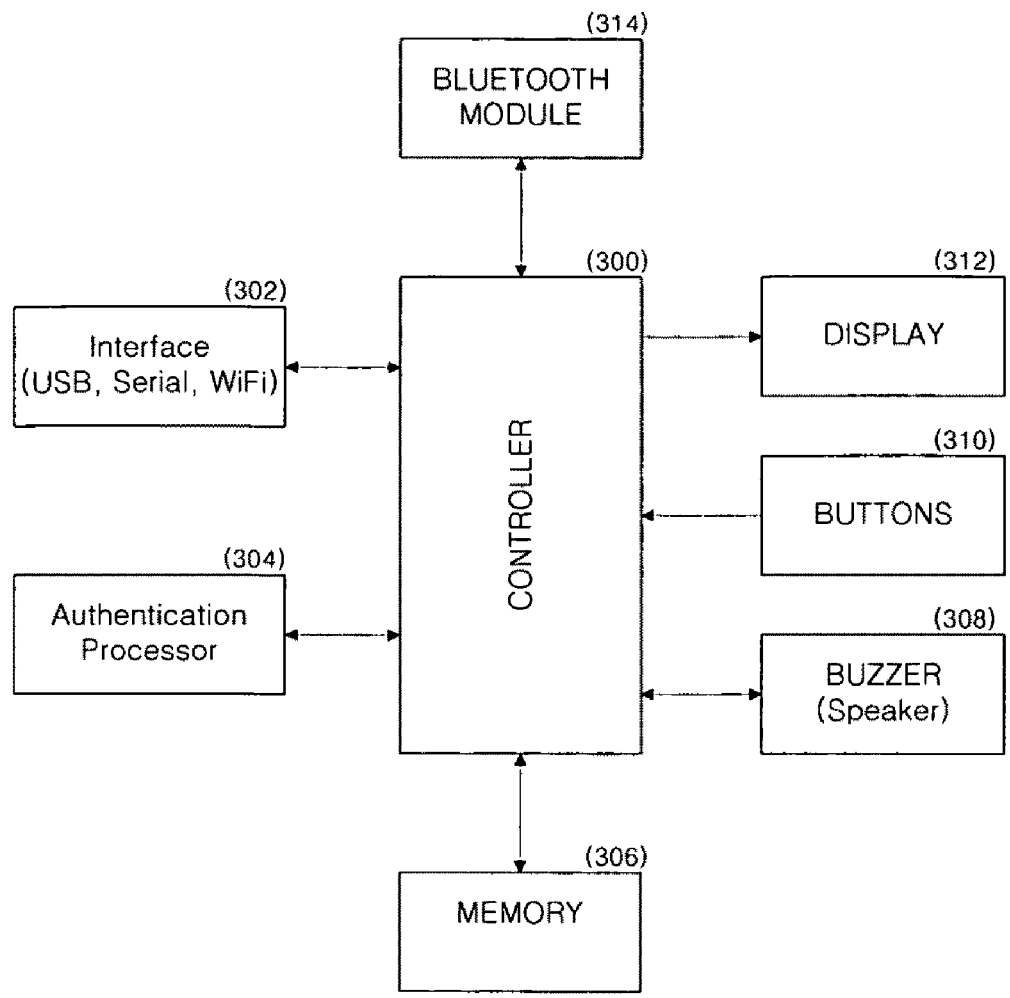
FIG. 3 is a process diagram illustrating Connecting Bluetooth® Device with Authentication Function.

With attention to FIG. 3, an illustrative diagram is depicted of a connecting (slave) Bluetooth® device with an authentication function. As seen therein, controller 300 and connected to memory 306, interface 302, authentication processor 304, buzzer 308, buttons 310, display 312, and Bluetooth® module 314. Under the control of a controller 300, a Bluetooth® enabled device searches for connectable neighboring Bluetooth® devices and performs a pairing operation on the searched neighboring Bluetooth® devices to acquire the addresses and name-related indicia of the searched neighboring Bluetooth® devices.

Figure 4:
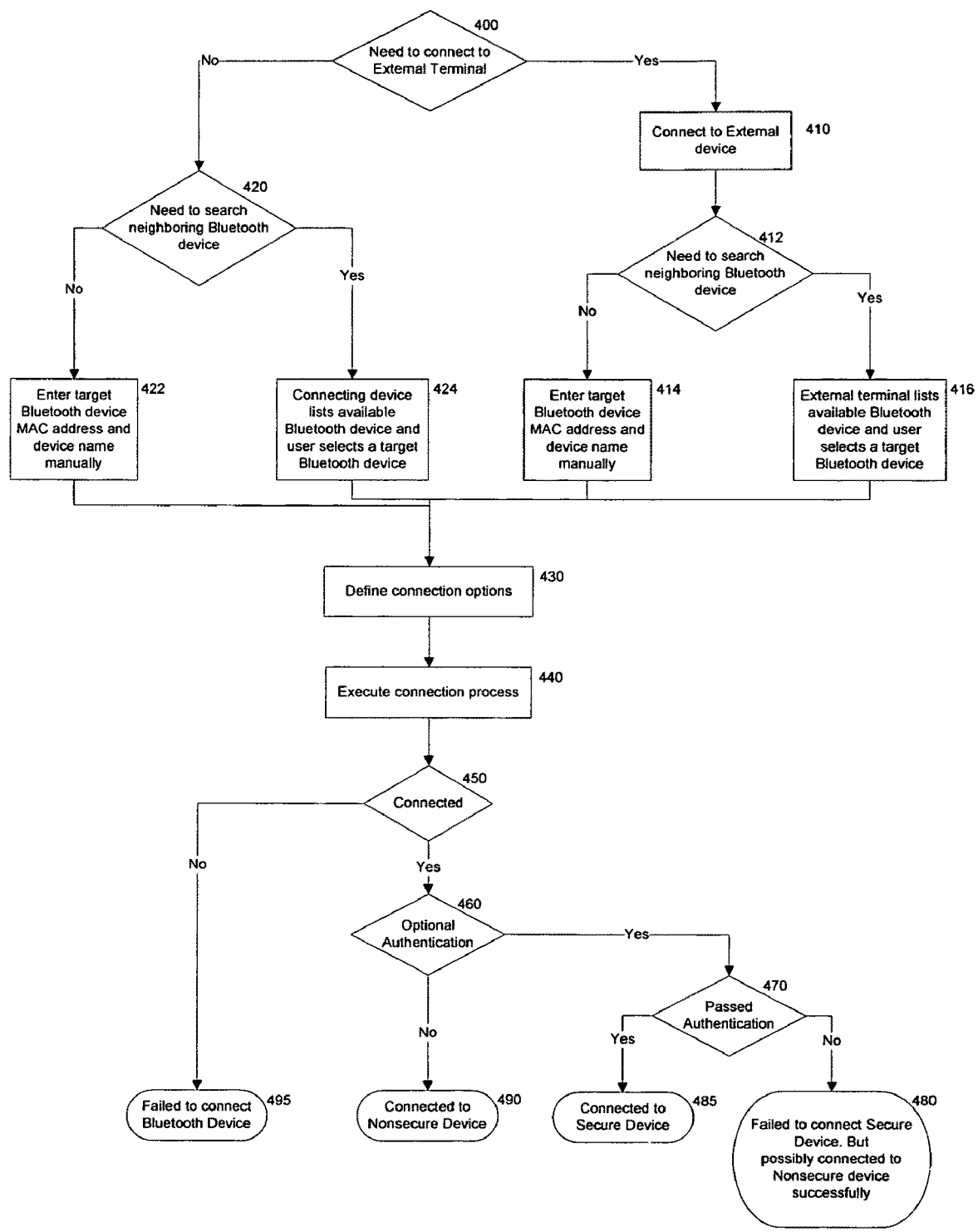
FIG. 4 is a flow diagram illustrating a Connecting (Slave) Bluetooth® Device may connect with a neighboring Bluetooth® target device (with or without an external terminal, through the illustrative Page, Inquiry and Authentication Functions.

FIG. 4 depicts a high level diagram of the aforementioned functions and processes, as well overall general page, inquiry, and authentication process flow of the present invention. Specifically, decision box 400 is an assessment as to whether you need to connect to an external terminal. If there is a need to an external terminal (410), then the process flow will initiate a search of neighboring Bluetooth® devices at 412, if needed. If there is no need to search neighboring Bluetooth® devices, at step 414, process will manually enter a MAC address and device name for a target Bluetooth® device. If there is a need to search neighboring Bluetooth® devices at step 416, then the external terminal lists all available Bluetooth® devices so that a user may select one or more target Bluetooth® devices. Similarly, there is no need to connect to an external terminal a decision will be made at step 420 as to whether there is a need to search neighboring Bluetooth® devices. If there is no need to search neighboring Bluetooth® devices, then a user may manually enter the MAC address and name of a given Bluetooth® device at 422: If there is a need to search a neighboring Bluetooth® device, then the connecting device lists all available Bluetooth® devices so that a user may select a given target Bluetooth® device at 424. Thereafter, the various connection options are defined at 430. In step 440, the selected connection process is executed. At step 450, the slave and target Bluetooth® devices (typically joysticks, keyboards, printers, etc.) are connected (or if there is a failure in connection is indicated at step 495, which is a general Bluetooth® failure indication that may stem from causes such as a PIN failure match, etc.). At step 460, there is an assessment as to whether the selected connection requires authentication (typically iPhone® and other secure connection based devices). If no authentication is required (typically Microsoft Windows® based mobile devices, RIM Blackberry® devices, etc.), then success indication is made at 490. If authentication is required (typically iPhone® mobile devices, etc.) then an assessment is made as to whether the authentication is passed at step 470. If it is not passed, then connection failure indication is made at 480 (may nevertheless be successfully connected to a non-secure device, as well). It is authentication has passed at 470, then a (secure) connection success indication is made at 485.

By way of illustration only, the above may be further understood in context of the following example which describes one exemplary set of devices that may be employed for the purposes of either the external terminal and/or the slave (connecting) device. Such devices may be various devices such as hand-held scanners such as the KDC™ 200 available from KoamTac™ Inc., of Princeton, N.J., any of which are exemplary peripheral devices that may desire to connect to a host such as an iPhone® or other Bluetooth® enabled device. If the KDC™ hand-held scanner is not employed, then the searching and connecting software of the KDC™ device, also sold as software by the name of KTSync™ (also available from KoamTac™ Inc., of Princeton, N.J.), may be downloaded into the external terminal and/or the slave (connecting) device as needed in order to effectuate the functionality described herein. Although the present invention is primarily described in terms of wireless embodiments (e.g., "Bluetooth® enabled devices"), it is also important to note that wired (USB wired connections, RS232, etc.) embodiments are also possible, and are considered within the scope of this invention, with or without complete Bluetooth® functionality. Whatever the variations thereof that might be paired with the inventive, the additional functionality and particulars described in U.S. patent application Ser. Nos. 12/005,470 (filed Dec. 27, 2007), 12/383,978 (filed Mar. 31, 2009), and 12/384,022 (filed Mar. 31, 2009) may be considered herein, and to that end, the specifications of these applications is hereby incorporated by reference herein in their respective entireties.

Alternatively, other devices may be used in place of the aforementioned external terminal and/or the slave (connecting) device. Such possibilities may include the following (1) for the described "terminal with programming capability" one might choose devices from the group comprising PCs, PDAs, bar code scanners (e.g., KDC™ 200, etc.), phones, and other devices, preferably wherein said devices have the following: (a) search functionality; (b) display means (including text to speech, user prompt function, etc.); (c) user input functionality (e.g., the ability to select device to connect such as voice recognition); and/or (d) communication functionality (e.g., ability to download a target device MAC to a connecting device, like the KDC™ or other device). Likely master devices (besides the aforementioned iPhone® or other phone) might include some variant of a master—Bluetooth® hub (such as the illustrative KDC™ 200 or other device), and a slave, such as a Bluetooth® printer, joystick, etc. One illustrative example (out of many possibilities) of an illustrative relationship might be shown with a multifunction printer, wherein a user need not connect a scanner and a printer to (via) a PC, and accordingly, the scanner and printer can work directly without PC to copy or print a document (e.g., the KDC™ (master hub) can connect to Bluetooth® printer and send a print command directly without going through any PC.).

In any case, the following details an illustrative paging (also called searching) function of the various Bluetooth® enabled devices working together within the overall concept of the present invention. The first variant of Paging (Searching) of a Bluetooth® device involves the use of what is termed an "internal programming capability" case. In this case, an illustrative KDC™ (or other peripheral (slave) device with built in Bluetooth® management software, etc.) utilizes its software to page a neighboring Bluetooth® using an internal paging (searching) function. In doing so, the MAC addresses of a given target Bluetooth® devices would be stored in connecting Bluetooth® peripheral memory. This case is employed where an internal Bluetooth® device search capability is available in the peripheral (slave) device. Thereafter, a PIN code can be entered if needed using keypad, buttons or other input methods, such as voice recognition. Alphanumeric characters would be displayed from "0" to "9" and "A" to "Z" sequentially or in some predefined order, if the connecting device has a display and more than one button. Alternatively, variant of Paging (Searching) of a Bluetooth® device involves the use of what is termed an "external programming capability" case. In this case, an illustrative KTSync™ Bluetooth® management software running on external terminal would be used for searching and listing neighborhood Bluetooth® (target) devices. Thereafter, the MAC addresses and PIN of the target Bluetooth® device(s) would be downloaded to the connecting Bluetooth® peripheral (slave) device memory from the external terminal with programming capability via cable such as serial or USB, or through wireless means such as Wi-Fi or Bluetooth®. Thereafter, and regardless of the preferred device set up(s) provisioned above, connection (inquiry) may be made as further described herein. To this end, the inventive method would also include various connection options which can manage the connection process more efficiently. Illustrative Inquiring (Connecting) processes might be depicted wherein a given Bluetooth® peripheral device would perform a Bluetooth® connection process by various methods including: (i) Pressing a button; (ii) Executing the connection process automatically upon powering on of a given (slave) device; and/or (iii) Using additional sensors, such as barcode scanner, camera function or proximity sensor to initiate the connection. Note that one may also contemplate defining a MAC address plus a PIN as a predefined special barcode or alternative machine readable symbol. Within this particular realm, a connecting device could even extract a MAC address and PIN number from a target Bluetooth® device through this special barcode, and/or through alternative machine readable symbols such as OCR fonts, as well as from printed characters and special symbols (any kind of characters or symbols that may be displayed on the display of the give device), either printed on a separate media such as a paper, or as displayed on the target device display. Usually, one would require a hand held scanner (such as the KDC™ unit or other units described herein for barcode reading, or even a device such as with a cell phone or PC/PDA camera with character recognition for non-barcode approaches) to effectuate such a variant of the invention. Therefore, in one additional illustrative embodiment, such software might read the barcode of the target device, and from the barcode, extract the standard MAC address and PIN (alpha) numbers from the barcode sequence. Other inventive approaches might also provide for a user to simple search or enter a MAC address using (downloaded) software, such as the KTSync™ running on a PC. In yet further alternative embodiments, it may be desired to simply use a smaller device with a built in display, such as the illustrative KDC™ 200 unit, which, with its built in Bluetooth® menu for search and inquiry, may offer a certain ease of use for a user, depending on the desired field of application.

In any case, the following outlined steps may define the various aspects of the inventive processes herein:
1. Registering a Target Bluetooth® Device
  A. STEP 1: List & Modify
    i. Provide for a user download MAC address and PIN to connecting Bluetooth® device using an external third party terminal Bluetooth® connection program;
    ii. User can then browse stored MAC address in a connecting device that has a display or text to speech function (or other human interpretable output mechanism); and
    iii. User can thereafter delete or change stored MAC addresses position if user input mechanism is available (e.g., a button, etc.).
  B. STEP 2: Enable/Disable store MAC/PIN of paired device
    i. Bluetooth® device would add MAC/PIN of newly paired device if this option is enabled; and
  C. STEP 3: Store location of newly paired device
    i. User can select the location of newly paired device, with priority, either to the first, to last, or a specific position.
2. Connect Method Selection
  A. POSSIBLE STEP: No Search & Manual Connect
    i. User browses MAC address(es) and executes connection process manually.
  B. POSSIBLE STEP: No Search & Auto Connect
    i. Connecting Bluetooth® device tries to connect stored MAC address(es) one by one sequentially, or through a certain rule based sequence.
  C. POSSIBLE STEP: Search & Manual Connect
    i. Connecting Bluetooth® device searches neighboring Bluetooth® devices;
    ii. Connecting Bluetooth® device displays MAC addresses and/or neighboring Bluetooth® device names; and iii. User select device to connect.
  D. POSSIBLE STEP: Search & Auto Connect
    i. Connecting Bluetooth® device searches available Bluetooth® devices;
    ii. Connecting Bluetooth® device connects to the device registered in connecting Bluetooth® device memory; and iii. Connection priority would be determined by predefined rule.
3. Connect Filtering Option
  i. User can discriminate among connecting Bluetooth® devices based upon various filtering options, such as MAC address range, Bluetooth® device name, and Bluetooth® signal strength.

Any downloaded third party software such as KTSync™ can list the MAC address(es) of available neighboring Bluetooth® devices by using search function, as well as manual entry by a user. When used in conjunction with the KDC™ (instead of by itself with another type of Bluetooth® device), it may also download MAC address (of iPhone® and/or pin code of other neighboring target Bluetooth® device) in order to connect to KDC™. This third party software could, in one alternative embodiment, initiate a connection by invoking the native connection function of any given slave device in order to effectuate the above. Regardless of how provisioned, it is further worth noting that under any given configuration of software and devices, because a slave can connect to a master under the present invention, it also implies that a slave can connect to slave. Hence, slave devices can connect to each other, and furthermore, a "slave" may connect to either another slave or to a master in a chain of other types of devices, if necessary.

As stated above, there are cases (such as the illustrative iPhone® which may also require authentication in addition to the page and inquiry steps described herein. To that end, the present invention also contemplates an Additional Authentication Option. This option recognizes the fact that certain neighboring target Bluetooth® devices cannot permit the paging and inquiry to result in a complete connection without the proper authentication. In the illustrative case of the iPhone®, one cannot communicate with an iPhone® without acquiring a proper key from an Apple authentication processor. In order to accomplish this, the illustrative KDC™ 200 unit may be used, as there is an authentication chip located inside of KDC™ 200. However, in an alternative embodiment, one can implement either an authentication chip (e.g., an Apple iPhone® chip for an iPhone®, or the equivalent for other closed Bluetooth® systems), or alternatively, a substitute for the authentication chip in the form of authentication software that will provide similar authentication codes as those that might be generated by the micro-code of the authentication chip, thereby avoiding the need to have such a chip. In any case, the following steps might illustrate one example of how to procedurally complete the authentication process. First, a Bluetooth® device that requires a secure connection (authentication), such as the Apple iPhone® (but normally not Microsoft Windows® enabled devices or RIM Blackberry® devices) would therefore necessarily utilize the inventive Authentication option from the connecting (slave) device. The connecting device checks the existence of additional authentication process (either hardware or software implementation) in the device. The connecting device initiates additional authentication process if additional authentication process if enabled, and does not initiate if not enabled. If, however, the device does not require a secure connection (such is the case with normal SPP devices such as RIM Blackberry® or Microsoft Windows® based mobile), and hence, the inventive process would thereby disable this Authentication option either manually or automatically.

Alternate embodiments of the present invention can also comprise computer readable codes or code segment(s) on a computer readable medium that executes all of the above described approaches. The computer readable medium includes data storage devices that can store data that can be read by a computer system. Examples of a computer readable medium include magnetic storage media (such as ROM, floppy disks, and hard disks, among others), and optical recording media (such as CD-ROMs or DVDs). The computer readable medium can also be distributed over network coupled computer systems so that the computer readable code is stored and executed in a distributed fashion. In additional embodiments, it is explicitly contemplated within the scope of the invention described herein that it may be used in a multiplicity of wired and wireless environments, over different communication protocols, including Bluetooth®, ZigBee, Wi-Fi and/or WiMax. Although the practical applications of the above are legion, in one embodiment the illustrative application of the invention to iPhone®s may prove especially useful, but the invention is indeed susceptible to various modifications and alternative forms, and accordingly, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method for providing improved wireless connection using third party programming capability, said method comprising the steps of:
    (a) determining whether at least one slave device needs to connect to an external terminal in order to perform a search and connect function of at least one neighboring wireless target device(s);
    (b) connecting, when said at least one slave device needs to connect to an external terminal in order to perform a search and connect function of said at least one neighboring wireless target device(s), to said external terminal;
    (c) determining whether there is a need to search for said at least one neighboring wireless target device(s);
    (d) entering, when there is no need to search for said neighboring wireless target device(s), at least one of the following comprising a MAC address, PIN code and a device name of said at least one neighboring wireless target device(s) manually;
    (e) generating, when there is a need to search for said at least one neighboring wireless target device, lists of available said at least one neighboring wireless target device(s) at said external terminal where said slave device and said external terminal are connected, and generating lists of available said at least one neighboring wireless target device(s) at said slave device where said slave device has not connected to said external terminal;
    (f) selecting said at least one neighboring wireless target device(s) for connection;
    (g) defining connection options with said at least one neighboring wireless target device(s), including an automatic or manual connection option;
    (h) executing a connection between said slave device and said at least one neighboring wireless target device(s) based upon said at least one automatic or manual connection option;
    (i) determining whether said at least one neighboring wireless target device(s) requires additional authentication, wherein said step of determining whether said at least one neighboring wireless target device(s) requires additional authentication including a recognition as to whether said at least one neighboring wireless target device(s) is a closed system device that prevents paging and inquiry from resulting in a complete connection; and
    (j) executing, where said at least one neighboring wireless target device(s) requires said additional authentication, an additional authentication between said slave device and said at least one neighboring wireless target device(s).

2. The method of claim 1 further comprising:
    wherein said step of determining whether said at least one neighboring wireless device(s) requires said additional authentication further comprises the step of detecting the presence of enabled additional authentication in either hardware or software found in said at least one wireless neighboring device(s);
    executing said additional authentication through at least one of the following of an additional authentication chip or additional authentication software for providing additional authentication code to said at least one neighboring wireless device(s); and
    disabling said additional authentication where said presence of enabled additional authentication is not detected.

3. The method of claim 1 further comprising the steps of:
    reading a MAC address and PIN number from said at least one neighboring wireless target device(s) through the use of at least a barcode reader or an optical character reader, wherein said step of reading further includes the step of providing for a prefix and suffix option that executes a read of at least one beginning or at least one ending digit of a barcode serial number.

4. A wireless enabled device for providing improved wireless connection, said device comprising:
    (a) a memory unit configured to store instructions;
    (b) a processor configured for executing the following instructions:
    (c) determining whether at least one slave device needs to connect to an external terminal in order to perform a search and connect function of at least one neighboring wireless target device(s);
    (d) connecting, when said at least one slave device needs to connect to an external terminal in order to perform a search and connect function of said at least one neighboring wireless target device(s), to said external terminal;
    (e) determining whether there is a need to search for said at least one neighboring wireless target device(s);
    (f) entering, when there is no need to search for said neighboring wireless target device(s), at least one of the following comprising a MAC address, PIN code and a device name of said at least one neighboring wireless target device(s) manually;
    (g) generating, when there is a need to search for said at least one neighboring wireless target device, lists of available said at least one neighboring wireless target device(s) at said external terminal where said slave device and said external terminal are connected, and generating lists of available said at least one neighboring wireless target device(s) and said slave device where said slave device has not connected to said external terminal;
    (h) selecting said at least one neighboring wireless target device(s) for connection;
    (i) defining connection options with said at least one neighboring wireless target device(s), including at least one automatic or manual connection option; and (j) executing a connection between said slave device and said at least one neighboring wireless target device(s) based upon said at least one automatic or manual connection option;

(k) determining whether said at least one neighboring wireless target device(s) requires additional authentication, wherein said step of determining whether said at least one neighboring wireless target device(s) requires additional authentication including a recognition as to whether said at least one neighboring wireless target device(s) is a closed system device that prevents paging and inquiry from resulting in a complete connection; and (l) executing, where said at least one neighboring wireless target device(s) requires said additional authentication, an additional authentication between said slave device and said at least one neighboring wireless target device (s).

5. The device of claim 4 further comprising:

wherein said step of determining whether said at least one neighboring wireless device(s) requires said additional authentication further comprises the step of detecting the presence of enabled additional authentication in either hardware or software found in said at least one wireless neighboring device(s);

executing said additional authentication through at least one of the following of an additional authentication chip or additional authentication software for providing additional authentication code to said at least one neighboring wireless device(s); and disabling said additional authentication where said presence of enabled additional authentication is not detected.

6. The device of claim 4, further comprising the ability to execute the steps of:

reading a MAC address and PIN number from said at least one neighboring target wireless device through the use of at least a barcode reader or an optical character reader, wherein said step of reading further includes the step of providing for a prefix and suffix option that executes a read of at least one beginning or at least one ending digit of a barcode serial number.

7. A non-transitory computer-readable recording medium having recorded thereon a program read by a computer system for use on a slave wireless device for detecting and connecting with a neighboring wireless target device(s) comprising:

a first code segment for determining whether at least one slave device needs to connect to an external terminal in order to perform a search and connect function of at least one neighboring wireless target device(s);

a second code segment for connecting, when said at least one slave device needs to connect to an external terminal in order to perform a search and connect function of said at least one neighboring wireless target device(s), to said external terminal;

a third code segment for determining whether there is a need to search for said at least one neighboring wireless target device(s);

a fourth code segment for entering, when there is no need to search for said neighboring wireless target device(s), at least one of the following comprising a MAC address, PIN code and a device name of said at least one neighboring wireless target device(s) manually;

a fifth code segment for generating, when there is a need to search for said at least one neighboring wireless target device, lists of available said at least one neighboring wireless target device(s) at said external terminal where said slave device and said external terminal are connected, and generating lists of available said at least one neighboring wireless target device(s) and said slave device where said slave device has not connected to said external terminal;

a sixth code segment for selecting said at least one neighboring wireless target device(s) for connection;

a seventh code segment for defining connection options with said at least one neighboring wireless target device (s), including at least one automatic or manual connection option; and an eighth code segment for executing a connection between said slave device and said at least one neighboring wireless target device(s) based upon said at least one automatic or manual connection option a ninth code segment for determining whether said at least one neighboring wireless target device(s) requires additional authentication, wherein said step of determining whether said at least one neighboring wireless target device(s) requires additional authentication including a recognition as to whether said at least one neighboring wireless target device(s) is a closed system device that prevents paging and inquiry from resulting in a complete connection; and a tenth code segment for executing, where said at least one neighboring wireless target device(s) requires said additional authentication, an additional authentication between said slave device and said at least one neighboring wireless target device(s).

8. The non-transitory computer-readable recording medium having recorded thereon a program read by a computer system for use on a slave wireless device for detecting and connecting with a neighboring wireless target device(s) of claim 7, further comprising:

said ninth a code segment for determining whether said at least one neighboring wireless target device(s) requires additional authentication further comprises code for detecting the presence of enabled additional authentication in either hardware or software found in said at least one wireless neighboring device(s);

an eleventh code segment for controlling any existing additional authentication chip and for providing, where there is no said additional authentication chip, additional authentication code to said at least one neighboring wireless device(s);

a twelfth code segment for executing said additional authentication by providing additional authentication code to said at least one neighboring wireless device(s); and a thirteenth code segment for disabling said additional authentication where said presence of enabled additional authentication is not detected.

9. The non-transitory computer-readable recording medium having recorded thereon a program read by a computer system for use on a slave wireless device for detecting and connecting with a neighboring wireless target device(s) of claim 8, further comprising:

a fourteenth code segment for reading a MAC address and PIN number from said at least one neighboring target wireless device through the use of at least a barcode reader or an optical character reader, wherein said fourteenth code segment further includes a fifteenth code segment for providing for a prefix and suffix option that executes a read of at least one beginning or at least one ending digit of a barcode serial number.

* * * * *